United States Patent [19]

Mayer et al.

[11] Patent Number: 5,641,571
[45] Date of Patent: Jun. 24, 1997

[54] POLYTETRAFLUOROETHYLENE MICOR POWDERS, THEIR PREPARATION AND USE

[75] Inventors: Ludwig Mayer, Burghausen; Kai-Uwe Tönnes, Rüsselsheim; Hermann Blädel, Emmerting, all of Germany

[73] Assignee: Hoechst Aktiengesellschaft, Germany

[21] Appl. No.: 538,771

[22] Filed: Oct. 5, 1995

Related U.S. Application Data

[63] Continuation of Ser. No. 308,710, Sep. 19, 1994, abandoned.

[30] Foreign Application Priority Data

Sep. 21, 1993 [DE] Germany ............... 43 31 971.8

[51] Int. Cl.$^6$ .................... B32B 5/16; C08F 16/24
[52] U.S. Cl. .................... 428/402; 526/247; 526/249; 526/255
[58] Field of Search ............... 428/402; 526/247, 526/249, 255

[56] References Cited

U.S. PATENT DOCUMENTS

| | | |
|---|---|---|
| 3,629,219 | 12/1971 | Esker ............... 260/92.1 |
| 3,953,412 | 4/1976 | Saito et al. . |
| 3,956,000 | 5/1976 | Kuhls et al. . |
| 4,036,802 | 7/1977 | Poirier . |
| 4,076,760 | 2/1978 | Hartwimmer . |
| 4,078,134 | 3/1978 | Kuhls et al. . |
| 4,078,135 | 3/1978 | Sulzbach et al. . |
| 4,774,304 | 9/1988 | Kuhls et al. . |
| 4,898,779 | 2/1990 | Yoshimura et al. . |
| 5,176,958 | 1/1993 | Shimizu et al. . |

FOREIGN PATENT DOCUMENTS 0271243  6/1988  European Pat. Off. .

OTHER PUBLICATIONS

Tuminello, W.H., et al, *Macromolecules* 21:2606–2610 (1988).

Hawley's Condensed Chemical Dictionary 1987 p. 805.

*Primary Examiner*—Joseph L. Schofer
*Assistant Examiner*—N. Sarofim
*Attorney, Agent, or Firm*—Connolly & Hutz

[57] ABSTRACT

Polytetrafluoroethylene micropowders, which can contain up to about 3% by weight of comonomers, are obtained with a narrow molecular weight distribution, a narrow range of specific surface area and a primary particle size of from 150 to 250 nm by polymerization in aqueous medium using hydrogen, methane or ethane as chain transfer agent and at an availability of free radicals remaining essentially constant over the polymerization time. These micropowders are particularly suitable for preparations of polyacetals which give only small deposits in the molds during melt processing and have increased color stability.

6 Claims, No Drawings

POLYTETRAFLUOROETHYLENE MICOR POWDERS, THEIR PREPARATION AND USE

This application is a continuation application of 08/308,710 Sep. 19, 1994, abandoned.

DESCRIPTION

The invention relates to novel polytetrafluoroethylene (PTFE) micropowders or waxes, which have a polydispersity $M_w/M_n$ of from 1.5 to 2.5, preferably from 1.5 to 2, a specific surface area (by BET) of from 7 to 13 m$^2$/g, preferably from 8 to 12 m$^2$/g, and a primary particle size of from 150 to 250 nm. The invention additionally relates to a process for preparing these novel micropowders, their use for producing polyacetal preparations, the preparations thus obtained and their use.

The micropowders of the invention comprise tetrafluoroethylene (TFE) units with or without a small amount of units, which can be copolymerized with TFE, of monomers, for example a lower perfluoroalkene such as hexafluoropropene, or a lower perfluoro-(alkyl vinyl) ether such as perfluoro-(propyl vinyl) ether. These comonomers are present in the polymer in an amount of up to about 3% by weight.

The polydispersity of the novel micropowders, expressed as the ratio of the average molecular mass $M_w$ to the number average $M_n$, is determined by the method described by Tuminello et al, Macromolecules 21 (1988) 2606 to 2610. These authors had already prepared a low molecular-weight PTFE by polymerization of TFE with disuccinic peroxide (and thus in organic medium) and with a hydrocarbon as chain-transfer agent.

The novel micropowders are obtained by polymerization of TFE, with or without the abovementioned modifying comonomers, in aqueous medium in the presence of hydrogen, methane or ethane as chain transfer agent and inorganic initiators at an availability of free radicals remaining essentially constant over the polymerization time.

The availability of free radicals remaining essentially constant means that the initiators, depending on the decomposition rate of the initiator, are added either all at once or distributed essentially uniformly over the polymerization time and the remaining parameters such as temperature, mixing and monomer addition are kept essentially constant.

Suitable initiators are, in particular, inorganic peroxo compounds such as persulfates, in particular alkali metal or ammonium persulfate, or also permanganates. The persulfates are advantageously used in the temperature range from 50° to 90° C., in particular at about 70° C., and permanganates are used at temperatures of from 20° to 40° C., in particular about 30° C.

Otherwise, the polymerization proceeds in a manner known per se.

The novel micropowders are suitable, in particular, as additives or "modifiers" for polyacetals such as polyoxymethylene. The addition of the novel micropowders effects a considerable reduction in the deposits in the molds during melt processing. Furthermore, the color stability is considerably improved, so that the moldings obtained with them no longer have the sometimes considerable brown discolorations which occurred with the micropowders hitherto customary as modifiers.

The novel micropowders are usually mixed into the polyacetals in amounts of up to 25% by weight, preferably from 10 to 20% by weight. The invention therefore also provides polyacetal preparations containing from 5 to 25% by weight, preferably from 10 to 20% by weight, of micropowder of the invention. The invention furthermore provides for the use of these preparations for melt processing.

The invention is illustrated by the following examples. Percentages are by weight.

The melt flow index (MFI) is determined in accordance with DIN 53 735 or ASTM D-1238 at 372° C. and the indicated load using a nozzle diameter of 2.08 mm.

EXAMPLE 1

An internally enameled polymerization reactor having a total volume of 195 l, provided with an impeller stirrer, is charged with 118 l of deionized water and 120 g of ammonium perfluorooctanoate (30% strength in water) are dissolved therein. After sealing the reactor, it is first flushed five times with nitrogen and subsequently once with 1.0 bar of TFE.

After depressurization and heating to 68° C., 0.12 bar of ethane are pumped in via a line with moderate stirring. The stirring rate is then increased to 210 rpm. Then TFE is fed into the reactor via the gas phase, until a total pressure of 7.4 bar is reached. The polymerization is then initiated by pumping in 10.0 g of ammonium persulfate dissolved in 300 ml of deionized water.

As soon as the pressure begins to fall, further TFE corresponding to the consumption is supplied via the gas phase, so that the total pressure of 7.4 bar is maintained. The heat liberated is removed by cooling the reactor wall and the temperature of 68° C. is thus maintained.

After feeding 35.7 kg of TFE into the reactor, the monomer supply is interrupted, the reactor is depressurized and flushed a number of times with $N_2$.
Properties of the dispersion:
Primary particle size: 200 nm
pH: 3.9

A part of the micropowder dispersion obtained is worked up as follows:

A 2 l glass vessel fitted with a 4-blade stirrer and baffle is charged with 1 kg of a 12% strength dispersion which is obtained by dilution with deionized water. From this dispersion, the polymer is precipitated at 1,000 rpm and room temperature using 5 ml of concentrated hydrochloric acid. After 10 minutes of further stirring at 1,000 rpm, the material is washed three times with 1 l of deionized water for 2 minutes at 1,000 rpm. The powder is dried by heating for 15 hours at 230° C.
Properties of the micropowder:
MFI: 10 kg load 1.6 g/10 min
Particle size: 7 μm
Specific surface area (BET): 9.5 m$^2$/g
$M_w/M_n$ (Tuminello): 1.75
$M_w$ (Tuminello): 1.9·10$^5$ g/mol
Color of the pressure-sintered plate: white

EXAMPLE 2

The procedure of Example 1 is repeated, but pumping in 0.35 bar of ethane and initiating with 15 g of ammonium persulfate.
Properties of the dispersion:
Primary particle size: 175 nm
pH: 3.5
Properties of the micropowder:
MFI: 2.16 kg load 6.6 g/10 min Particle size: 6 μm
Specific surface area (BET): 11.4 m$^2$/g
$M_w/M_n$ (Tuminello): 1.56
$M_w$ (Tuminello): 8.9·10$^4$ g/mol
Color of the pressure-sintered plate: white

EXAMPLE 3

The procedure of Example 1 is repeated, but pumping in 0.05 bar of ethane and 395 g of hexafluoropropene (HFP) and likewise initiating with 10 g of ammonium persulfate.
Properties of the dispersion:
Primary particle size: 220 nm
pH: 3.4
Properties of the micropowder:
MFI: 10 kg load 0.7 g/10 min
Particle size: 12 μm
Specific surface area (BET): 8.8 m$^2$/g
$M_w/M_n$ (Tuminello): 1.90
$M_w$ (Tuminello): 2.6·10$^5$ g/mol
Color of the pressure-sintered plate: white
HFP content (IR): 1.6% by weight

EXAMPLE 4

The procedure of Example 1 is repeated, but pumping in 8 bar of TFE, 2.3 bar of hydrogen and 0.5 bar of hexafluoropropene and likewise initiating with 10 g of ammonium persulfate.
Properties of the dispersion:
Primary particle size: 210 nm
pH: 3.9
Properties of the micropowder:
MFI: 10 kg load 0.8 g/10 min
Particle size: 8.8 μm
Specific surface area (BET): 12.1 m$^2$/g
$M_w/M_n$ (Tuminello): 1.83
$M_w$ (Tuminello): 2.4·10$^5$ g/mol
Color of the pressure-sintered plate: white
HFP content (IR): 0.9% by weight Comparative example (Preparation using the method of DE-C 22 35 885)

A polymerization reactor having a total volume of 3,600 l, provided with an anchor stirrer and blade baffle is charged with 2550 l of deionized water and 7.3 kg of NH$_3$ (25% strength aqueous solution), and 2.2 kg of perfluorooctanoate (30% strength in water) are dissolved therein. After sealing the reactor it is first flushed five times with nitrogen and subsequently once with 1.0 bar of TFE.

After depressurization and heating to 33° C., 66 ml of stock copper solution, comprising 360 g of CuSO$_4$·5H$_2$O, 9500 g of deionized water and 5 ml of H$_2$SO$_4$, 1.25 l of chloroform and 222 g of sodium bisulfite (dissolved in 1 l of deionized water) are pumped in via a line with moderate stirring. The stirring rate is then increased to 65 rpm. Then TFE is fed into the reactor via the gas phase, until a total pressure of 15 bar is reached. The polymerization is then initiated by pumping in 351 g of ammonium peroxodisulfate dissolved in 1 l of deionized water.

The work-up is carried out in a similar way to that in Example 1.
Properties of the dispersion:
Primary particle size: 120 nm
pH: 9.0
Properties of the micropowder:
MFI: 0.3 g/10 min
Particle size: 7 μm
Specific surface area (BET): 15.6 m$^2$/g
$M_w/M_n$ (Tuminello): 3.6
$M_w$ (Tuminello): 4.3·10$^5$ g/mol
Color of the pressure-sintered plate: brown

We claim:

1. A polytetrafluoroethylene wax composition comprising a polytetrafluoroethylene wax containing up to about 3% by weight of monomers copolymerizable with tetrafluoroethylene; which wax comprises precipitated primary particles and has a polydispersability $M_w/M_n$ of from 1.5 to 2.5 and a specific surface area determined by BET of from 7 to 13 m$^2$/g, the size of said primary particles, prior to precipitation, ranging from 150 to 250 nm.

2. A wax composition as claimed in claim 1, wherein the polydispersity is from 1.5 to 2.

3. A wax composition as claimed in claim 1, wherein the copolymerizable monomer is a lower perfluoro-(alkyl vinyl) ether or hexafluoropropene.

4. A wax as claimed in claim 1, containing up to 1.6% by weight of the comonomers.

5. A wax composition as claimed in claim 1, wherein the specific surface area is from 8 to 12 m$^2$.

6. A polytetrafluoroethylene wax composition comprising a polytetrafluoroethylene wax containing up to about 3% by weight of monomers copolymerizable with tetrafluoroethylene; which wax comprises precipitated primary particles, the repeating units of said wax having been formed by polymerizing the monomer or monomers in an aqueous medium in the presence of at least one free radical-producing inorganic initiator which was supplying free radicals essentially constantly throughout the polymerization time, said wax having a polydispersability $M_w/M_n$ of from 1.5 to 2.5 and a specific surface area determined by BET of from 7 to 13 m$^2$/g; the size of said primary particles, prior to precipitation, ranging from 150 to 250 nm.

* * * * *